(12) United States Patent
Brandis et al.

(10) Patent No.: US 6,654,343 B1
(45) Date of Patent: Nov. 25, 2003

(54) METHOD AND SYSTEM FOR SWITCH FABRIC FLOW CONTROL

(75) Inventors: Dirk Kurt Brandis, Novato, CA (US); Yantao Jia, Stow, MA (US); Bob Reissfelder, Westwood, MA (US); Lei Jin, Irvine, CA (US); Shahzad Ali, Rohnert Park, CA (US); Stephen John West, Petaluma, CA (US); Hui Zhang, Santa Rosa, CA (US); Shuangxia Sarah Zhu, Rohnert Park, CA (US)

(73) Assignee: Turin Networks, Petaluma, CA (US)

( * ) Notice: Subject to any disclaimer, the term of this patent is extended or adjusted under 35 U.S.C. 154(b) by 0 days.

(21) Appl. No.: 09/812,985

(22) Filed: Mar. 19, 2001

(51) Int. Cl.$^7$ .............................................. G01R 31/08
(52) U.S. Cl. ...................... 370/229; 370/236; 370/389
(58) Field of Search ................................. 370/229, 230, 370/230.1, 231, 232, 235, 236, 252, 253, 260, 258, 363, 395, 395.42, 395.43

(56) References Cited

U.S. PATENT DOCUMENTS

| | | | |
|---|---|---|---|
| 5,774,453 A | * 6/1998 | Fukano et al. | 370/231 |
| 5,838,922 A | * 11/1998 | Galand et al. | 395/200.62 |
| 5,910,942 A | * 6/1999 | Grenot et al. | 370/236 |
| 5,959,991 A | * 9/1999 | Hatono et al. | 370/395 |
| 6,067,298 A | * 5/2000 | Shinohara | 370/395 |
| 6,324,165 B1 | * 11/2001 | Fan et al. | 370/232 |

OTHER PUBLICATIONS

Nick McKeown, Martin Izzard Adisak Mekkittikul, William Ellersick, Mark.
Horowitz, "The Tiny Tera: A Packet Switch Core", Dept. of electrical Enginerring & Computer.
Science, Stanford University, Stanford, CA 94305–4070, DSP R&D Center, Corporate Research & Development, Texas Instruments, Incorp., PO Box 655474, MS446, Dallas, TX75265.

* cited by examiner

*Primary Examiner*—Wellington Chin
*Assistant Examiner*—Brenda Pham
(74) *Attorney, Agent, or Firm*—Blakely Sokoloff Taylor & Zafman LLP

(57) ABSTRACT

An ingress is coupled with the switch fabric to send flows of data across the switch fabric. Each of the flows of data is associated with a flow identification information and a priority level. An egress is coupled with the switch fabric to receive the flows of data from the ingress. The egress is configured to send one or more flow control messages to the ingress to control a pace that the ingress sends the flows of data to the egress. Each of the flow control messages includes one or more of a flow identification information, an egress space availability information and a new priority level for a flow.

34 Claims, 5 Drawing Sheets

METHOD AND SYSTEM FOR SWITCH FABRIC FLOW CONTROL

FIELD OF THE INVENTION

The present invention relates generally to field of data switching. More specifically, the present invention is directed to controlling flow of packets/cells in a switch.

BACKGROUND

The desire to integrate data, voice, image, video and other traffic over high speed digital trunks has led to the requirement for faster networks including the capability to route more information faster from one node to another node. A switch performs this routing of information. Generally, the switch consists of three logical elements: ports, a switch fabric and a scheduler.

Routing and buffering functions are two major functions performed by a switch fabric. New packets arriving at an ingress are transferred by the scheduler across the switch fabric to an egress. The ingress refers to a side of the switch which receives arriving packets (or incoming traffic). The egress refers to a side of the switch which sends the packets out from the switch.

Most of the switches today are implemented using a centralized crossbar approach. FIG. 1 is an exemplary illustration of a centralized crossbar switch. The packets arrive at the centralized crossbar switch 100 at multiple ingress ports 105 on the ingress 102. They are transferred across the switch fabric 110 to multiple egress ports 115 on the egress 104 and then sent out to an output link (not shown). The centralized crossbar switch 100 can transfer packets between multiple ingress port-to-egress port connections simultaneously.

A centralized scheduler controls the transfer of the packets from the ingress ports 105 to the egress ports 115. Every packet that arrives at the ingress ports 105 has to be registered in the centralized scheduler. Each packet then waits for a decision by the centralized scheduler directing it to be transferred through the switch fabric 110. With fixed size packets, all the transmissions through the switch fabric 110 are synchronized.

Each packet belongs to a flow, which carries data belonging to an application. A flow may have multiple packets. There may be multiple flows arriving at the ingress ports 105 at the same time. Since the packets in these multiple flows may be transferred to the same egress port, each of these packets waits for its turn in ingress buffers (not shown) in the ingress 102.

The centralized scheduler examines the packets in the ingress buffers and chooses a set of conflict-free connections among the appropriate ingress ports 105 and egress ports 115 based upon the configuration of the switch fabric 110. One of the egress ports 115 may receive packets from one or more ingress ports 105. However, at any one time, the centralized scheduler ensures that each ingress port is connected to at most one egress port, and that each egress port is connected to at most one ingress port.

Each packet transferred across the switch fabric-110 by the centralized scheduler waits in egress buffers (not shown) in the egress 104 to be selected by the centralized scheduler for transmission out of the switch. The centralized scheduler places the selected packets in the appropriate egress ports 115 to have the packets transmitted out to an output link.

The requirement that every packet has to be registered with the centralized scheduler and that the centralized scheduler serves as a common arbitration point to determine the packets to be sent across the switch fabric 110, among others, make the centralized cross bar approach very complex.

SUMMARY OF THE INVENTION

A system for controlling flows across a switch fabric is disclosed. In one embodiment, an ingress is coupled with the switch fabric to send flows of data across the switch fabric. Each of the flows of data is associated with a flow identification information and a priority level. An egress is coupled with the switch fabric to receive the flows of data from the ingress. The egress is configured to send one or more flow control messages to the ingress to control a pace that the ingress sends the flows of data to the egress. Each of the flow control messages includes one or more of a flow identification information, an egress space availability information and a new priority level for a flow.

Other objects, features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
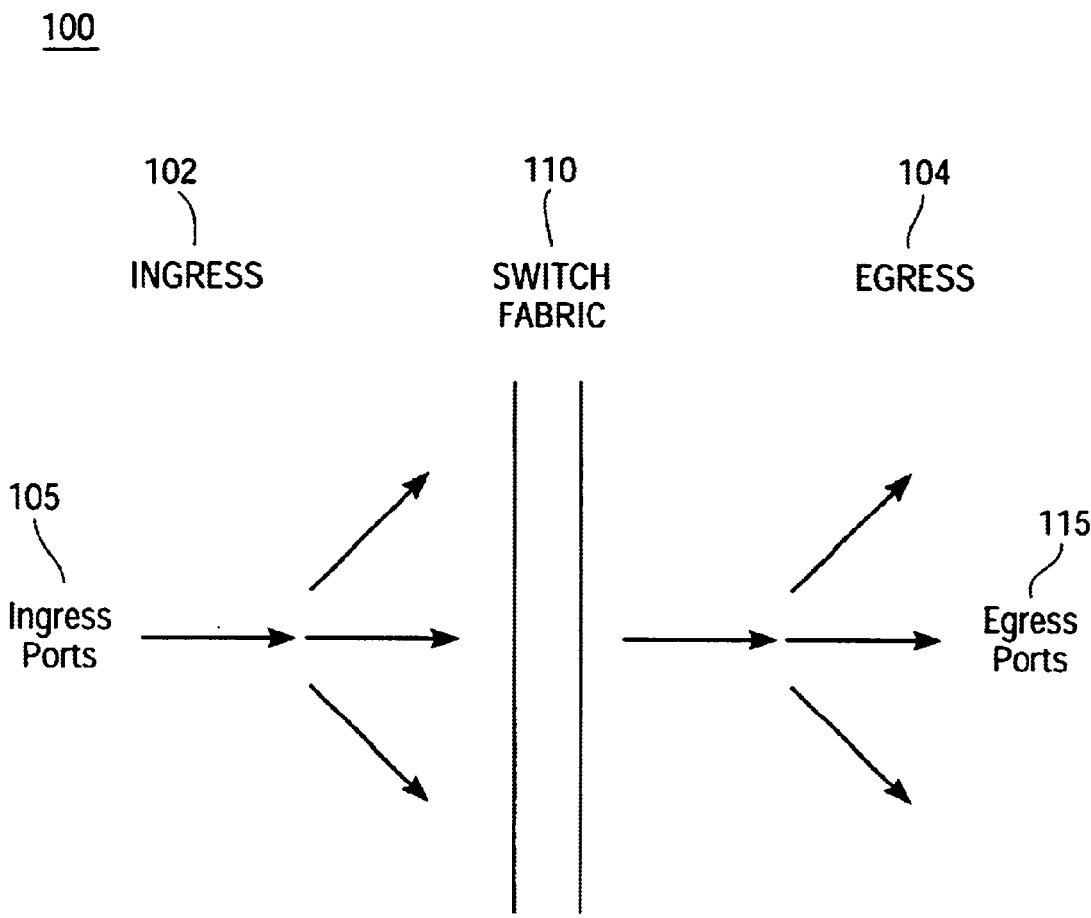
FIG. 1 is an exemplary diagram of a centralized crossbar switch.

A method and apparatus for controlling packets sent from an ingress across a switch to an egress is disclosed. Such control is referred to as flow control. In one embodiment, the method for controlling packets allows the egress to communicate information with the ingress about a specific flow so that packets belonging to that flow can be processed.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to system for performing the operations herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the required method processes. The required structure for a variety of these systems will appear from the description below. In addition, the present invention is not described with reference to any particular programming language. It will be appreciated that a variety of programming languages may be used to implement the teachings of the invention as described herein.

OVERVIEW

Figure 2:
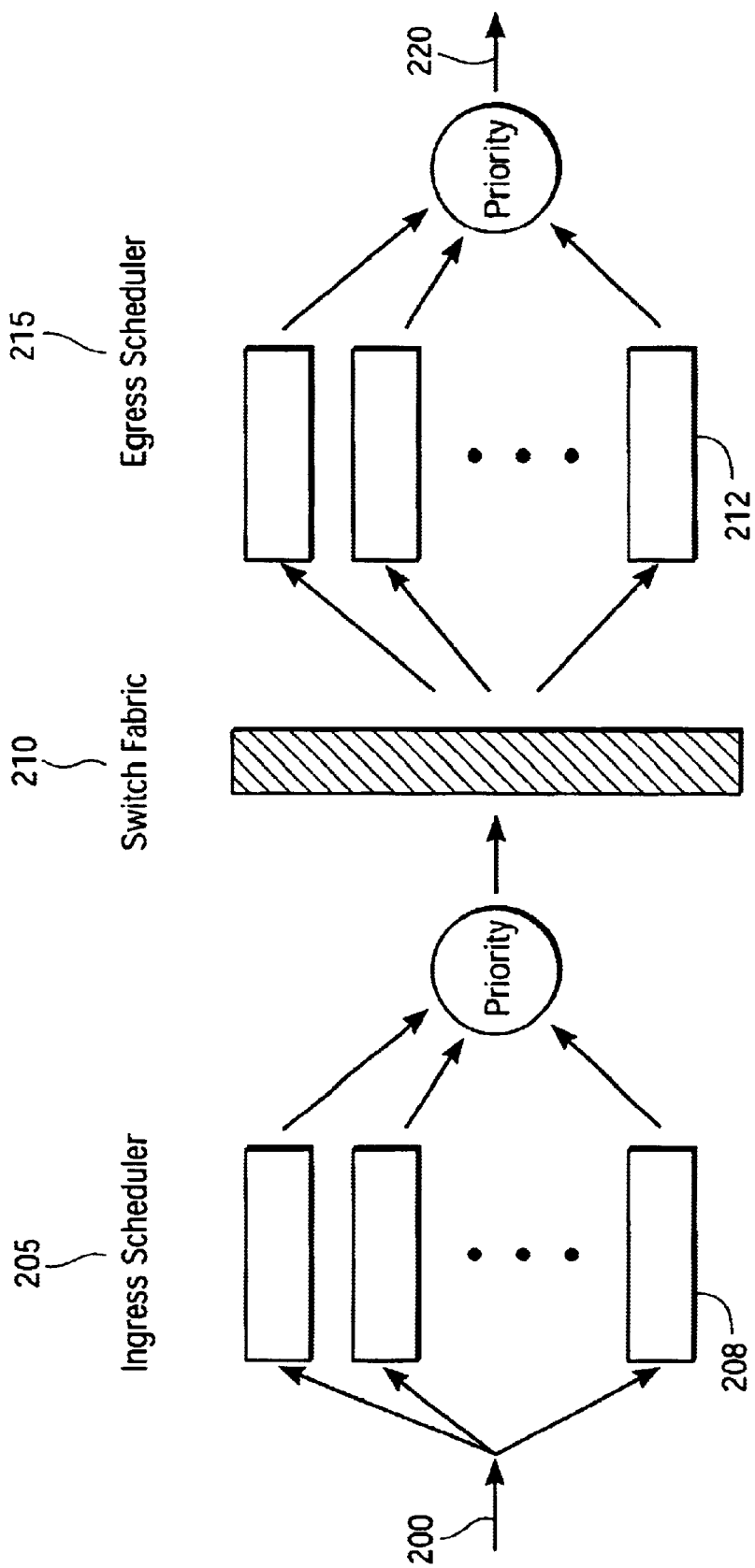
FIG. 2 is an exemplary illustration of distributed arbitration.

In one embodiment, a distributed arbitration architecture is used to control the flows of packets/cells from the ingress to the egress. With distributed arbitration, the complexity of having to send routing information to a common arbitration point is avoided. FIG. 2 is an exemplary illustration of distributed arbitration. Instead of one common arbitration point, independent ingress arbitration and egress arbitration are performed by an ingress scheduler 205 and an egress scheduler 215, respectively. The ingress scheduler 205 along with the ingres buffers 205 are elements of the ingress. The egress scheduler 215 along with the egress buffers 212 are elements of the egress. The egress scheduler 215 knows information about, and bases scheduling and routing decisions on, the packets in its egress buffers 212. Similarly, the ingress scheduler 205 knows information about, and bases scheduling and routing decisions on, the packets in its ingress buffers 208.

Referring to FIG. 2, packets arriving at an ingress port (not shown) are queued in one of the ingress buffers 208. Packets from same flows are queued in same ingress buffer. Each packet competes against the other packets to be selected by the ingress scheduler 205 to be transferred across the switch fabric 210. The ingress scheduler 205 selects a packet from the ingress buffers 208 based on a priority level. For example, packets belonging to a flow associated with real time traffic may be given higher priority level than packets belonging to a flow associated with non-real time traffic. Furthermore,: there may be different rates for different streams of the same type of traffic where each of the different streams has a different priority level. For example, a subscriber may be willing to pay for a higher rate to have its real time traffic processed by the ingress scheduler 205 before real time traffic belonging to another subscriber who is willing to pay at a lower rate.

In one embodiment, transmissions by the ingress scheduler 205 and receptions by the egress scheduler 215 are synchronized.

The packets (e.g., IP packets) being transmitted from the ingress to the egress have variable lengths. Each packet is then sent across the switch fabric 210 as a sequence of cells. Cells can be of variable length, but in one embodiment, cells are constrained between a minimum value (e.g., 40 bytes) and a maximum value (e.g., 127 bytes). The last cell may indicate the end of the packet.

One problem of sending the packets as cells occurs when some of the cells belonging to a packet are in the egress buffers 212 while the remaining cells belonging to the same packet are in the ingress buffers 208. When a packet with a higher priority level arrives at the ingress and needs to be serviced first, this packet (and its cells) will be transferred across the switch fabric 210 first, while the remaining cells of the previous packet wait in the ingress buffers 208. This situation occurs because the egress scheduler 215 manages the output link 220 and not the input link 200. The egress scheduler 215 is notified of arrivals of new flows only when these flows appear at the egress buffers 212. The egress scheduler 215 has no knowledge of what occurs in the ingress side. In one embodiment, once the ingress scheduler 205 selects a packet, all of the cells in that packet are moved across the switch fabric 210 before another packet of the same priority level is selected. There may be multiple ingress schedulers 205 and they may transfer cells from multiple packets (e.g., 32) across the switch fabric 210 simultaneously.

Depending on the type of traffic, the ingress may receive data in the form of packets and/or cells (e.g., ATM cells, IP packets) from the ingress ports. In one embodiment, an ingress port can only receive one type of traffic (e.g., either cells or packets). The cells or packets are then placed in the appropriate ingress buffers 208 and then selected by the ingress scheduler 205 based on their priorities.

Different types of flows affect the egress buffers 212 differently. For example, when the flows are associated with high priority level real time traffic (i.e., fast flows), the flows may quickly take up all of the space in the egress buffers 212.

New flows associated with traffic having high priority levels arriving at the ingress should not be blocked from the egress because all of the space in the egress buffer 212 is consumed by the flows associated with the traffic having lower priority levels. Since the space in the egress buffer 212 is limited, there needs to be a way to communicate to the ingress scheduler 205 when a flow is using too much of the space in the egress buffer 212 and that the ingress scheduler 205 should stop sending any more cells from that flow until the egress is ready to receive more cells.

In one embodiment, the space in the egress buffer 212 is controlled to ensure that there is sufficient space for flows of all priorities. Using flow control messages, the transfer of cells between the ingress and the egress is controlled when the space in the egress buffer 212 begins to reach its capacity. In one embodiment, the egress explicitly controls the ingress scheduler 205 by indicating of which flow the egress is willing to receive more cells and vice versa. This is done by adjusting the priority level of the flow. For example, the priority level of a flow that has fully consumed its share of space in the egress buffer 212 is reduced from a current priority level. The priority level of a flow may be reduced to zero, in which the case no additional cells from that flow are transferred by the ingress scheduler 205 to the egress.

In one embodiment, a flow has some form of representation in the egress in order for the egress to be able to send the flow control messages to the ingress. To have representation, cells belonging to that flow are already occupying space in the egress buffer 212. Once the flow has representation in the egress buffer 212, the egress can make decisions to obtain the remaining cells of the flow from the ingress buffer 205. Each time a new cell comes into the egress and occupies space on the egress buffer 212, the egress has an opportunity to send a flow control message to the ingress.

In one embodiment, each flow is associated with a flow identification information. Flow control messages for a flow are communicated by the egress to the ingress using the flow identification information. The ingress uses the flow identification information to locate the flow in the ingress buffers 208. For example, the egress may use the flow control messages to indicate that the particular flow has occupied its share of space in the egress buffers 212 and that the ingress scheduler 205 needs to slow down (e.g., send cells from that flow at a slower pace) or to stop sending additional cells from that flow. When the egress buffers 212 run out of space, portions of the flow need to remain in the ingress buffers 208 until space for the flow becomes available. For example, the space for the flow becomes available when cells from that flow are sent by the egress scheduler 215 to the output link 220.

Figure 3:
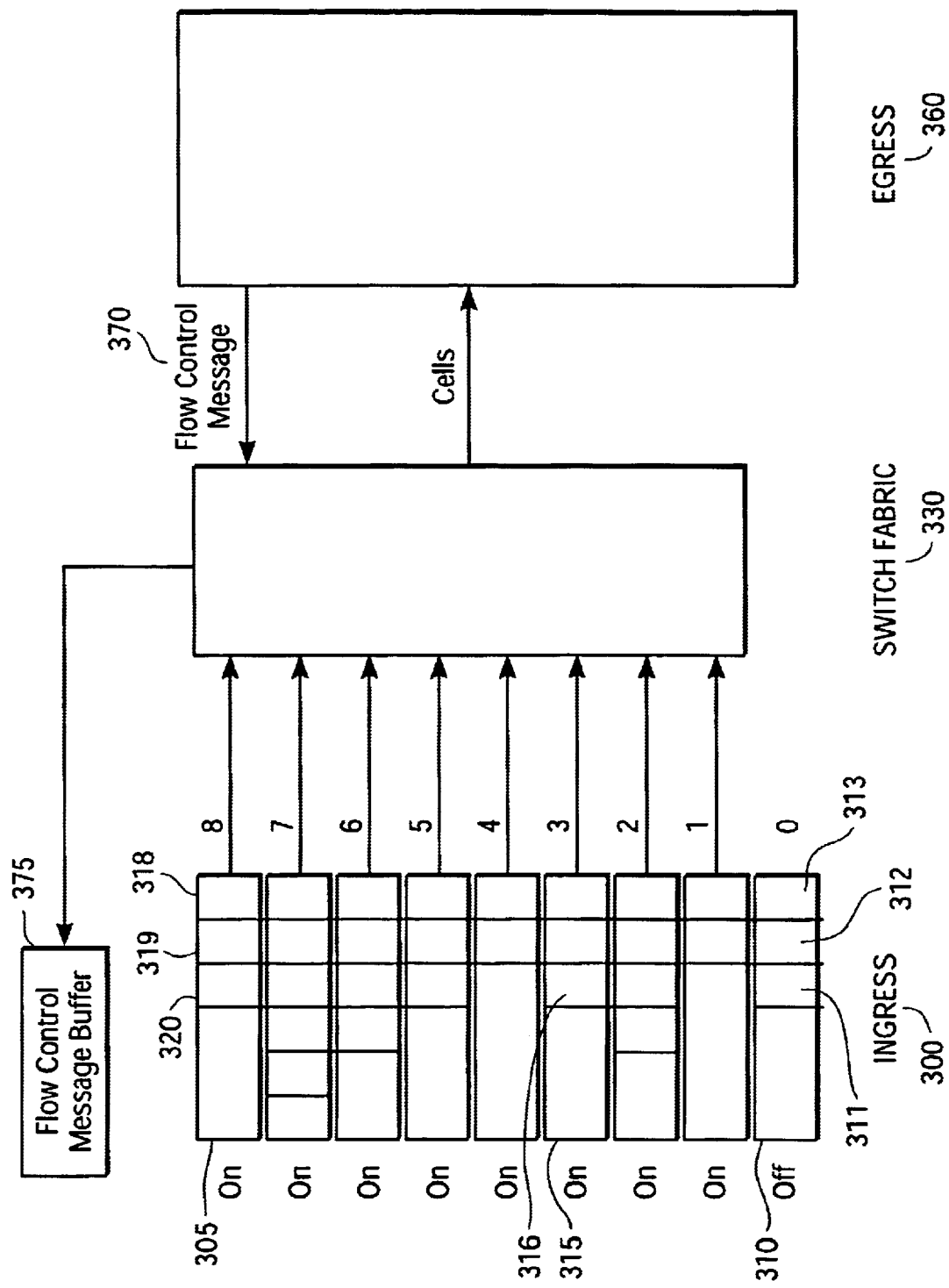
FIG. 3 is an exemplary diagram illustrating flow levels in an ingress.

FIG. 3 is an exemplary diagram illustrating flow queues in one embodiment of an ingress. The ingress 300 includes multiple flow queues and an ingress scheduler (not shown). Referring to FIG. 3, the ingress 300 maintains the incoming flows in multiple flow queues. In this example, each flow is represented once across all of the flow queues. Cells in each flow are sent across the switch fabric 330 to the egress 360. In one embodiment, each flow queue is associated with a priority level. For example, with the priority levels being from 0 to 8, the flow. queue 305 is associated with the priority level 8 and the flow queue 310 is associated with the priority level 0. In one embodiment, the priority level zero (0) is a lowest priority level. A new flow arriving at the ingress 300 is placed in the flow queue associated with the priority level similar to the priority level of the flow. Alternatively, the new flows can be placed in any one of the flow queues except for the flow queue associated with the priority level zero. Once that new flow is moved to the head of the flow queue it is placed in, the new flow can be moved to the back of the flow queue having the same priority level.

Each flow queue stores one or more flows. For example, the flow queue 305 has three flows 318, 319 and 320. Being at a head of the flow queue 305, the flow 318 is examined by the ingress scheduler before the flows 319 and 320. Pointers may be used to determine a beginning of each flow. As discussed herein, each flow has a priority level, and the priority level of a flow may or may not be the same as the priority level associated with the flow queue in which the flow resides. For example, when the egress 360 determines that the ingress scheduler needs to slow the pace of sending cells from an offending flow, a flow control message for that offending flow together with a new lower priority level are sent by the egress 360. The offending flow is a flow that uses almost all or its entire share of space in the egress buffer. For example, a flow becomes an offending flow when the flow's buffer occupancy exceeds an amount of space it is allowed to occupy.

The priority level of the offending flow is changed to the new lower priority level. In one embodiment, this offending flow remains in the same flow queue even though the flow queue is associated with a different priority level from the new priority level of the offending flow. When the offending flow moves to the head of the flow queue, the ingress scheduler moves the offending flow to a position in the back of a flow queue associated with the same priority level as the new lower priority level of the offending flow.

Referring to FIG. 3, the flow queues having priority levels 1 to 8 (i.e., nonzero) are always in an "ON" state. The flows in an "ON" flow queue are served in a first-in-first-out (FIFO) order. That is, a flow is only examined by the ingress 300 when it is at the head of the flow queue.

The flows in the flow queue 310 are not automatically examined by the ingress scheduler as the flows at the heads of the other flow queues. The flows in the flow queue 310 have to be specifically selected by the ingress scheduler and moved to another flow queue. For example, when a flow control message for the flow 312 is received from the egress 360 indicating a change of priority level of "0 to 3", the flow 312 is moved from its current position in the flow queue 310 to the flow queue 315. The flow 312 is placed at a position in the back of the flow queue 315. The flow 312 then waits for its turn to be selected by the ingress scheduler when it moves to the head of the flow queue 315. In one embodiment, a table may be used by the ingress 300 to keep track of each of the flows in the flow queues. When a flow control message is received for a flow, a table entry corresponding to the flow is updated with information in the flow control message. This information (e.g., change in priority level) may then be processed by the ingress scheduler when the flow moves to the head of its flow queue.

In the above example, the flow control message 370 may also indicate that a priority level for a particular flow is to be changed to zero, which means moving the flow from an "ON" flow queue to the "OFF" flow queue 310. For example, the flow control message 370 may require the ingress scheduler to move the flow 319 from the flow queue 305 to the flow queue 310. This may be because the flow 319 is an offending flow and the egress 360 does not want to receive any more cells from the flow 319. In one embodiment, the ingress scheduler moves the flow 319 to the flow queue 310 after the flow 319 reach the head of the flow queue 305 and a packet is transmitted. The flow 319 may be moved out of the "OFF" flow queue 310 when the space in the egress buffer becomes available. Alternatively, the flow control message 370 may indicate a change from one "ON" flow queue to another "ON" flow queue. For example, the flow control message 370 may indicate a priority level change of "4 to 3". In one embodiment, a change in the priority level of a flow from one "ON" flow queue to another "ON" flow queue can only occur when that flow reaches the head of the flow queue it is currently placed in.

In one embodiment, transition of a flow from one "ON" flow queue to the "OFF" flow queue suppresses transfer of the cells from the flow to the egress 360, whereas transition of a flow from one "ON" flow queue to another "ON" flow queue is accompanied by a transfer of cells from the flow to the egress 360. This allows some portions of the flow to be transferred and the remaining portions of the flow have to wait in the new flow queue. Alternatively, transitions to a higher priority flow queue are accompanied by a transfer of cells to the egress 360, while transitions to a lower priority flow queue are not accompanied by any transfer of cells to the egress 360.

The ingress 300 may receive multiple flow control messages 370 from the egress 360. These flow control messages may be stored in a flow control message buffer 375 by the ingress 300. This is because the ingress 300 cannot instantly serve all of the flow control messages 370 as they arrive from the egress 360. When-the flow control message buffer 375 is full, additional flow control messages are dropped. This may not be desirable because all of the flow control messages 370 are treated the same.

In one embodiment, each flow control message 370 includes an indication of how important the flow control message is perceived by the egress 360 (e.g., to indicate some level of urgency). This may be done by using an "important" bit in the flow control message 370. When the "important" bit is set to "ON" or "1", the flow control message 370 is considered important. When the "important" bit is set to "OFF" or "0", the flow control message 370 is considered not important. This "important" bit helps the ingress 300 manage the multiple flow control messages 370 sent by the egress 360. Furthermore, the flow control message buffer 375 may have a threshold such that when the number of flow control messages exceeds the threshold, all subsequent flow control messages 370 having the important bits set to "0" are dropped. In such a case, the threshold ensures that there is sufficient space reserved for the flow control messages 370 having the important bit set to "1".

The flow control message buffer 375 may be implemented as a FIFO queue. In one embodiment, the egress 360 may send non-important flow control messages 370 at a slower rate to reduce the possibility of flooding the flow control message buffer 375. For example, when the flow control messages 370 are not important, instead of sending them all, the egress 260 only sends some of them.

In one embodiment, the ingress scheduler processes the flows in the "ON" flow queues using a weighted round robin (WRR) procedure in which the weight of a flow corresponds to the priority level of the "ON" flow queue. For example, the flows in the "ON" flow queue 305 have higher weighted value than the flows in the "ON" flow queue 315, thereby causing the flows in the "ON" flow queue 305 to be selected by the ingress scheduler ahead of the flows in the other "ON" flow queues.

Using the WRR procedure, differentiated services may be offered. Within each flow, the cells are served in the FIFO order. However, within a flow queue, the constituent flows are selected using a round robin procedure in a manner well known in the art. As discussed above, the ingress scheduler selects a flow at the front of a flow queue, and the priority level of that flow is compared against the flow queue priority level. If they don't match, the flow is moved to the appropriate flow queue having the same priority level as the priority level value in the flow. If they match, the flow and its cells are processed.

Figure 4:
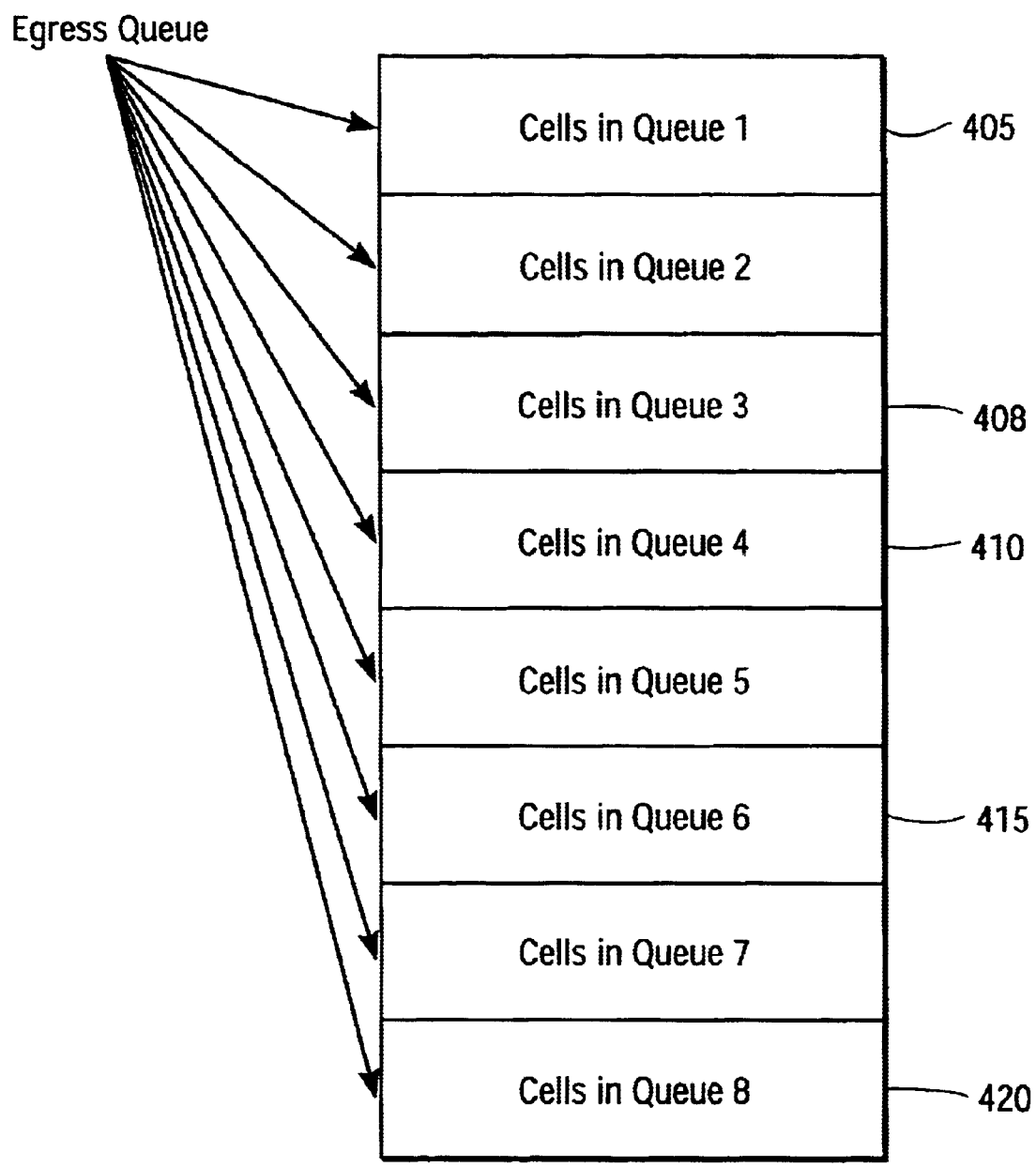
FIG. 4 is an exemplary diagram illustrating egress queues in an egress.

FIG. 4 is a diagram illustrating one embodiment of egress queues in an egress. Inside the egress buffer 400 are egress queues. For example, the egress buffer 400 has eight egress queues. In one embodiment, flows of the same priority level are stored in the same egress queue. For example, when the flow 318 in FIG. 3 is sent across the switch fabric 330, it will be inserted in the egress queue 420 in FIG. 4. The egress queue 420 is used to store flows having the priority level of 8. Similarly, when the flow 316 in FIG. 3 is sent across the switch fabric 330, it will be inserted in the egress queue 408 in FIG. 4. The egress queue 408 is used to store flows having the priority level of 3.

As discussed above, each flow is identified by its flow identification information. Inside each egress queue are one or more flows. The number of cells in the flow as compared to the size of the egress queue is indication of a queue occupancy level. In one embodiment, the egress makes the decision about the flow control message based on the occupancy level of the egress queue. Every time a new flow is set up in an egress queue, an evaluation is performed by the egress to determine an amount of space available in that egress queue.

In one embodiment, the available space is calculated dynamically such that the new flow obtains queue space as determined by the queue space already occupied by the other flows in the egress queues. For example, when the size of the queue is "B" and when the number of flows is "n", then a maximum amount of available queue space for a flow in the queue is in the order of (B/n). When "n" is one (1), the flow takes the entire queue space and prevents the other flows from entering the same egress queue.

In one embodiment, to be fair to the other flows, the amount of queue space available for any one flow is set in the order of (B/2n). The formula (B/2n) indicates a threshold queue space on an egress queue that a flow can get. The factor of 2 in the denominator is used to ensure that a single flow does not take any more than one half of the available queue space (i.e., B/2). This allows the flow to have a chance of having at most 50% of the queue space but not all of the queue space. The remaining 50% is saved for new flows. For example, when there are 100 blocks of memory to be used for an egress queue and only 2 blocks are used, the number of free blocks is very high (98). The flow control message sent to the ingress would indicate to the ingress that there is space in the queue and that the ingress scheduler can continue sending more cells belonging to the flow.

In one embodiment, hysteresis is used during the calculation of the available queue space. Hysteresis is used to reduce queue space allocation and the number of flow control messages. In another embodiment, hysteresis is used during calculation of the priority levels to reduce the number of flow control messages. In one embodiment, the amount of available queue space is determined by the following formula:

$$X=(B/2n)-F(\text{occupancy}),$$

where X is the amount of available queue space, (B/2n) is the current threshold, and F (occupancy) is the current occupancy level. Based on the available queue space X, a new priority level can be determined. For example, when the amount of available queue space X calculated for a flow is small, the egress wants to tell the ingress scheduler to send cells belonging to the flow at a slower pace. The new priority level for the flow is sent to the ingress in a flow control message.

Figure 5:
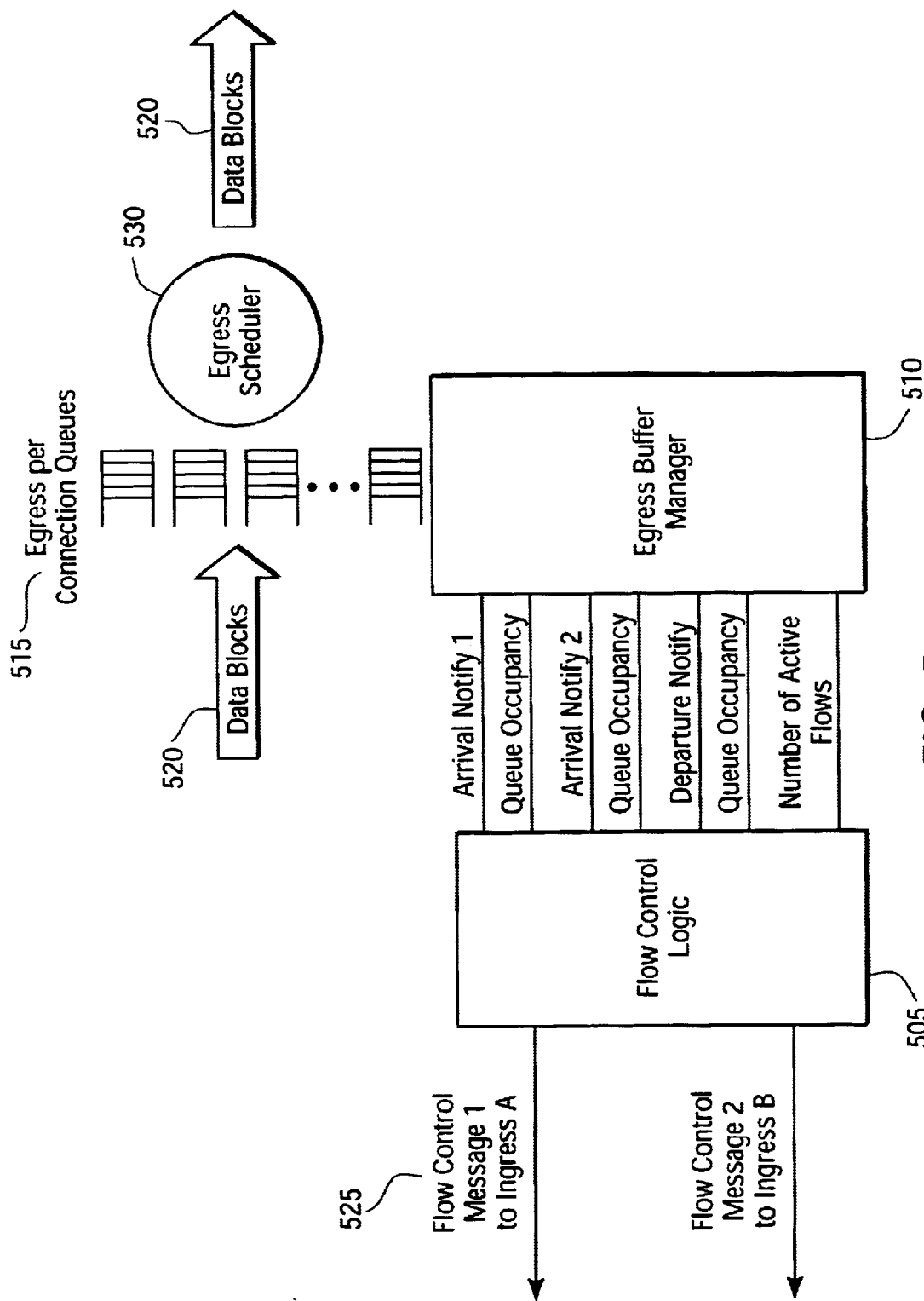
FIG. 5 is an exemplary illustration of flow control messages generation by the ingress.

FIG. 5 is a block diagram of one embodiment of flow control message generation by the egress. Flow data (data blocks) 520 transferred from the ingress are stored in the egress queues 515. The flow data 520 is then selected by the egress scheduler 530 and sent to the output link (not shown). The space in the egress queues 515 is allocated to the flow by the egress buffer manager 510. The egress buffer manager 510 maintains an occupancy level per flow in each of the egress queues 515. The egress buffer manager 510 also counts the total number of active flows. These values are made available to the flow control logic 505. The flow control logic 505 has information that it uses to identify a flow control message with a particular flow and a priority level to which the flow should be assigned on the ingress. The flow control logic 505 generates the flow control messages 525 and sends them to the ingress. The flow control messages 525 change the priority of the flow in the ingress based on the status of the egress queues 515.

The method described above can be stored in the memory of a computer system as a set of instructions (i.e., software). The set of instructions may reside, completely or at least partially, within the main memory and/or within the processor to be executed. In addition, the set of instructions to perform the methods described above could alternatively be stored on other forms of machine-readable media. For the purposes of this specification, the term "machine-readable media" shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

Alternatively, the logic to perform the methods as discussed above, could be implemented in additional computer and/or machine readable media, such as, for example, discrete hardware components as large-scale integrated circuits (LSI's), application-specific integrated circuits (ASIC's), Field Programmable Gate Arrays (FPGA), firmware such as electrically erasable programmable read-only memory (EEPROM's), and electrical, optical, acoustical and other forms of propagated signals (e.g., carrier waves, infrared signals, digital signals, etc.), etc.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A system, comprising:
    a switch fabric;
    an ingress coupled with the switch fabric to send flows of data across the switch fabric, each of the flows is associated with flow identification information; and
    an egress coupled with the switch fabric to receive the flows from the ingress and to send one or more flow control messages to the ingress to control a pace that the ingress sends the flows to the egress, each of the flow control messages including one or more of a flow identification information, an egress space availability information and a new priority level for a flow.

2. The system of claim 1, wherein the ingress comprises ingress flow queues, wherein in response to receiving a flow control message associated with one flow, the ingress locates the one flow in one of the ingress flow queues using the flow identification information.

3. The system of claim 2, wherein the ingress sends data from the one flow to the egress based on the egress space availability information in the flow control message associated with the one flow.

4. The system of claim 3, wherein the data from the one flow comprises one or more cells, and wherein at least one cell from the one flow has been received by the egress when the egress sends the flow control message associated with the one flow.

5. The system of claim 2, wherein when the flow control message associated with the one flow includes the new priority level, the ingress updates the one flow with the new priority level.

6. A system, comprising:
    a switch fabric;
    an ingress coupled with the switch fabric to send flows of data across the switch fabric, each of the flows is associated with flow identification information; and
    an egress coupled with the switch fabric to receive the flows from the ingress and to send one or more flow control messages to the ingress to control a pace that the ingress sends the flows to the egress, each of the flow control messages including one or more of a flow identification information, an egress space availability information and a new priority level for a flow,
    wherein the ingress comprises ingress flow queues, wherein in response to receiving a flow control message associated with one flow, the ingress locates the one flow in one of the ingress flow queues using the flow identification information,
    wherein the ingress flow queues comprises:
        a first set of one or more ingress flow queues having flows that are selected in a first-in-first-out order such that flow selection by the ingress occurs when flow position is at a head of the ingress flow queue, and
        a second set of one or more ingress flow queues having flows that are selected in any order such that flow selection by the ingress occurs regardless of flow position in the ingress flow queue.

7. The system of claim 6, wherein one ingress flow queue in the second set is associated with a lowest priority level.

8. The system of claim 6, wherein the ingress selects a flow having a highest priority level from the first set of one or more ingress flow queues.

9. The system of claim 6, wherein a new flow arriving at the ingress is placed in any of the ingress flow queues in the first set of ingress flow queues.

10. A system, comprising:
    a switch fabric;
    an ingress coupled with the switch fabric to send flows of data across the switch fabric, each of the flows is associated with flow identification information; and
    an egress coupled with the switch fabric to receive the flows from the ingress and to send one or more flow control messages to the ingress to control a pace that the ingress sends the flows to the egress, each of the flow control messages including one or more of a flow identification information, an egress space availability information and a new priority level for a flow,
    wherein the ingress comprises ingress flow queues, wherein in response to receiving a flow control message associated with one flow, the ingress locates the one flow in one of the ingress flow queues using the flow identification information,
    wherein when the flow control message associated with the one flow includes the new priority level, the ingress updates the one flow with the new priority level, and
    wherein the one flow having the new priority level is moved to a position in an ingress flow queue associated with a priority level similar to the new priority level of the one flow.

11. A system, comprising:
a switch fabric;
an ingress coupled with the switch fabric to send flows of data across the switch fabric, each of the flows is associated with flow identification information; and
an egress coupled with the switch fabric to receive the flows from the ingress and to send one or more flow control messages to the ingress to control a pace that the ingress sends the flows to the egress, each of the flow control messages including one or more of a flow identification information, an egress space availability information and a new priority level for a flow,
wherein the egress space availability information and the new priority level for an individual flow are calculated based on current and previous occupancy by the individual flow and current and previous occupancy of an aggregate of all flows in an egress queue.

12. A system, comprising:
a switch fabric;
an ingress coupled with the switch fabric to send flows of data across the switch fabric, each of the flows is associated with flow identification information; and
an egress coupled with the switch fabric to receive the flows from the ingress and to send one or more flow control messages to the ingress to control a pace that the ingress sends the flows to the egress, each of the flow control messages including one or more of a flow identification information, an egress space availability information and a new priority level for a flow,
wherein the egress space availability information and the new priority level for the flow are calculated using hysteresis to reduce egress space allocation changes, priority level changes and a number of flow control messages between the egress and the ingress.

13. A system, comprising:
a switch fabric;
an ingress coupled with the switch fabric to send flows of data across the switch fabric, each of the flows is associated with flow identification information; and
an egress coupled with the switch fabric to receive the flows from the ingress and to send one or more flow control messages to the ingress to control a pace that the ingress sends the flows to the egress, each of the flow control messages including one or more of a flow identification information, an egress space availability information and a new priority level for a flow,
wherein one of the flow control messages further comprises an importance bit to enable the ingress to decide if the one flow control message can be dropped.

14. The system of claim 13, further comprising a flow control message queue to store the flow control messages, and wherein the ingress drops non-important flow control messages when the flow control message queue reaches a threshold.

15. A system, comprising:
a switch fabric;
an ingress means for sending flows of data across the switch fabric, each of the flows is associated with flow identification information; and
an egress means for receiving the flows from the ingress means and sending one or more flow control messages to the ingress means to control a pace that the ingress means sends the flows to the egress means, each of the flow control messages including one or more of a flow identification information, an egress space availability information and a new priority level for a flow.

16. The system of claim 15, wherein the ingress means comprises ingress flow queues, wherein in response to receiving a flow control message associated with one flow, the ingress means locates the one flow in one of the ingress flow queues using the flow identification information.

17. The system of claim 16, wherein the ingress means sends data from the one flow to the egress means based on the egress space availability information in the flow control message associated with the one flow.

18. The system of claim 17, wherein the data from the one flow comprises one or more cells, and wherein at least one cell from the one flow has been received by the egress means when the egress means sends the flow control message associated with the one flow.

19. A system, comprising:
a switch fabric;
an ingress means for sending flows of data across the switch fabric, each of the flows is associated with flow identification information; and
an egress means for receiving the flows from the ingress means and sending one or more flow control messages to the ingress means to control a pace that the ingress means sends the flows to the egress means, each of the flow control messages including one or more of a flow identification information, an egress space availability information and a new priority level for a flow,
wherein the egress space availability information and the new priority level for an individual flow are calculated based on current and previous occupancy by the individual flow and current and previous occupancy of an aggregate of all flows in an egress queue.

20. A system, comprising:
a switch fabric;
an ingress means for sending flows of data across the switch fabric, each of the flows is associated with flow identification information; and
an egress means for receiving the flows from the ingress means and sending one or more flow control messages to the ingress means to control a pace that the ingress means sends the flows to the egress means, each of the flow control messages including one or more of a flow identification information, an egress space availability information and a new priority level for a flow,
wherein the egress space availability information and the new priority level for an individual flow are calculated using hysteresis to reduce egress space allocation changes, priority level changes and a number of flow control messages between the egress and the ingress.

21. A method, comprising:
receiving a first flow data for a flow from an ingress, the first flow data stored in an egress queue storing one or more flows, the flow associated with flow identification information;
determining space availability information in the egress queue for the flow; an
sending a flow control message to the ingress to control a pace that the ingress sends a second flow data for the flow, the flow control message comprising the flow identification information; and
determining a new priority level for the flow, wherein when the new priority level of the flow is lower than a current priority level of the flow, the ingress sends the second flow data at a slower pace than a current pace.

22. The method of claim 21, wherein the flow control message comprises the new priority level for the flow.

23. A method, comprising:
receiving a first flow data for a flow from an ingress, the first flow data stored in an egress queue storing one or more flows, the flow associated with flow identification information;
determining space availability information in the egress queue for the flow;
sending a flow control message to the ingress to control a pace that the ingress sends a second flow data for the flow, the flow control message comprising the flow identification information; and
determining a new priority level for the flow, wherein when the new priority level of the flow is lower than a current priority level of the flow, the ingress sends the second flow data at a slower pace than a current pace,
wherein the space availability information and the new priority level for the flow are calculated based on current and previous occupancy by the flow and current and previous occupancy of an aggregate of the one or more flows in the egress queue.

24. A method, comprising:
receiving a first flow data for a flow from an ingress, the first flow data stored in an egress queue storing one or more flows, the flow associated with flow identification information;
determining space availability information in the egress queue for the flow;
sending a flow control message to the ingress to control a pace that the ingress sends a second flow data for the flow, the flow control message comprising the flow identification information; and
determining a new priority level for the flow, wherein when the new priority level of the flow is lower than a current priority level of the flow, the ingress sends the second flow data at a slower pace than a current pace,
wherein the space availability information and the new priority level for the flow are calculated using hysteresis to reduce egress space allocation changes, priority level changes and a number of flow control messages sent to the ingress.

25. A method, comprising:
receiving a flow control message associated with a flow from an egress to determine a pace to send flow data from the flow to the egress, the flow control message comprising flow identification information and a priority level;
in response to receiving the flow control message, locating the flow in one
of multiple ingress flow queues using the flow identification information; and
sending the flow data from the flow to the egress based on information in the flow control message,
wherein the flow control message comprises space availability information for the flow and the flow data is sent to the egress based on the priority level in the flow control message associated with the flow.

26. The method of claim 25, wherein the flow data is sent to the egress based on the space availability information in the flow control message associated with the flow.

27. A method, comprising:
receiving a flow control message associated with a flow from an egress to determine a pace to send flow data from the flow to the egress, the flow control message comprising flow identification information and a priority level;
in response to receiving the flow control message, locating the flow in one of multiple ingress flow queues using the flow identification information; and
sending the flow data from the flow to the egress based on information in the flow control message,
wherein the multiple ingress flow queues comprises:
a first set of one or more ingress flow queues having flows that are selected in a first-in-first-out order such that flow selection occurs when flow position is at a head of the ingress flow queue, and
a second set of one or more ingress flow queues having flows that are selected in any order such that flow selection occurs regardless of flow position in the ingress flow queue.

28. The method of claim 27, wherein an arriving flow is placed in any of the ingress flow queues in the first set of ingress flow queues.

29. The method of claim 27, wherein each of the ingress flow queues in the first set is associated with a priority level, wherein flow data from a flow in an ingress flow queue in the first set of ingress flow queues having a highest priority level is processed first, and wherein the one ingress flow queue in the second set is associated with a lowest priority level.

30. The method of claim 29, wherein flow data for an individual flow is not sent to the egress when the individual flow is placed in the one ingress flow queue in the second set of ingress flow queues.

31. The method of claim 30, wherein the individual flow is placed in the one ingress flow queue in the second set of ingress flow queues when the priority level in the flow control message associated with the individual flow is the same as the priority level associated with the one ingress flow queue in the second set of flow queues.

32. The method of claim 31, wherein an individual flow is removed from the one ingress flow queue in the second set of ingress flow queues when the priority level in the flow control message associated with the individual flow is higher than the priority level associated with the one ingress flow queue in the second set of flow queues, wherein the individual flow is placed in an ingress flow queue in the first set of ingress flow queues.

33. The method of claim 32, wherein the individual flow is placed in the ingress flow queue associated with the same priority level included in the flow control message for the individual flow.

34. A method, comprising:
receiving a flow control message associated with a flow from an egress to determine a pace to send flow data from the flow to the egress, the flow control message comprising flow identification information and a priority level;
in response to receiving the flow control message, locating the flow in one of multiple ingress flow queues using the flow identification information; and
sending the flow data from the flow to the egress based on information in the flow control message,
wherein the flow control message further comprises an importance bit such that when set as non-important, the flow control message can be dropped.

* * * * *